Feb. 7, 1950      I. CISSKI      2,496,269
INDEXING DETENT MEANS FOR OPTICAL LENS TURRETS
Filed Aug. 2, 1946      2 Sheets-Sheet 1
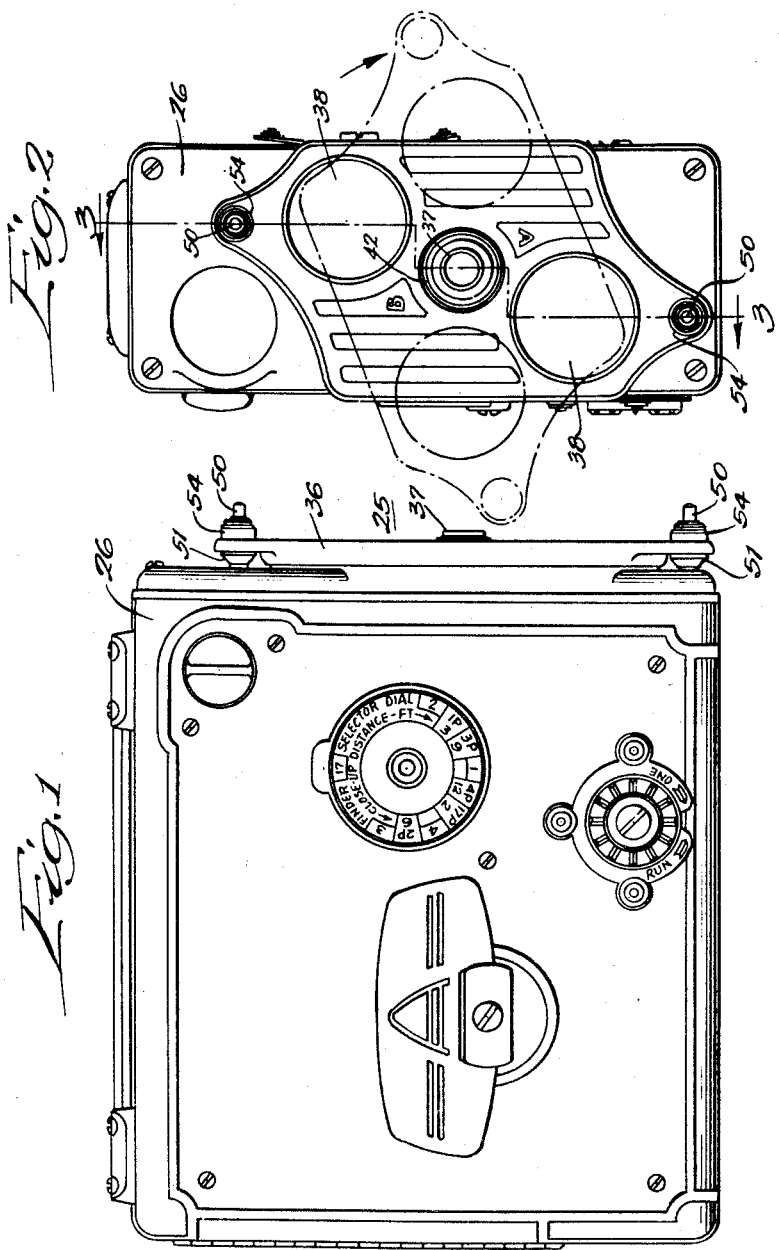

Feb. 7, 1950  I. CISSKI  2,496,269
INDEXING DETENT MEANS FOR OPTICAL LENS TURRETS
Filed Aug. 2, 1946  2 Sheets-Sheet 2
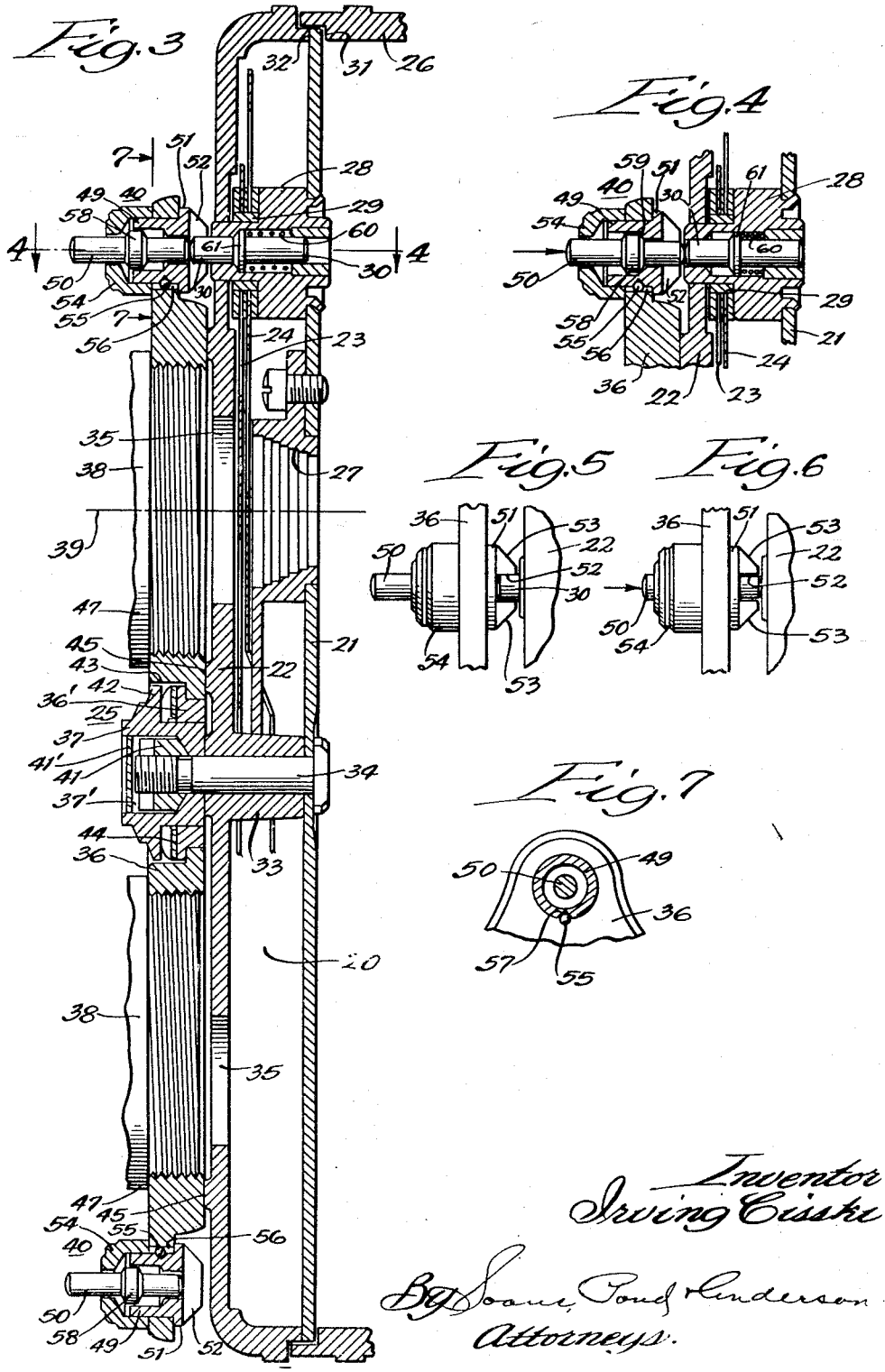

Patented Feb. 7, 1950

2,496,269

UNITED STATES PATENT OFFICE 2,496,269

INDEXING DETENT MEANS FOR OPTICAL LENS TURRETS

Irving Cisski, Schiller Park, Ill., assignor to Ampro Corporation, Chicago, Ill., a corporation of Illinois Application August 2, 1946, Serial No. 687,922

7 Claims. (Cl. 88—57)

The present invention relates to indexing means, more particularly for turrets that are used in optical systems for carrying one or more mounts for optical elements, such as lenses, filters, screens, etc., so that the mount or mounts selectively can be brought into and out of registration with a cooperative optical element of the optical system. The device is particularly designed for camera lens turrets, and is disclosed as being embodied in a camera of a particular design, but the broader aspects of the invention are not limited to cameras, or to other motion picture apparatus.

The principal object of the invention is to provide a simple, highly satisfactory and inexpensive indexing detent for an optical turret, which will provide positive locking of the turret with a selected mount in registration with the optical system, and permit instant and easy release for movement of the turret.

Another object is to provide a novel form of keeper assembly particularly designed for mounting on an optical turret comprising a rotatable plate.

Another object is to provide a novel form of keeper for an indexing detent that will lock automatically when the turret is brought to an operating position.

Still another object is the provision of a novel detent pin mounting for a lens turret used in a cinematograph having a reciprocating shutter.

The preferred embodiment of this invention is shown in the accompanying drawings wherein:

Fig. 1 is a side elevation of an improved form of magazine camera whereon is mounted a lens turret having an indexing detent constructed in accordance with this invention;

Fig. 2 is an end view of the same, showing in dotted outline an intermediate position of the turret when being rotated for changing lenses;

Fig. 3 is an enlarged sectional elevation, taken on the line 3—3 of Fig. 2;

Fig. 4 is a fragmentary cross-sectional detail of the turret-locking mechanism and release means in their retracted positions incident to the shifting of the turret, as viewed from the plane of the line 4—4 of Fig. 3;

Fig. 5 is a fragmentary plan view of the same, in locked position, however;

Fig. 6 is a view similar to Fig. 5 showing the locking mechanism in released position; and Fig. 7 is a fragmentary detail taken on the line 7—7, of Fig. 3, showing how the index-pin locator, on the turret plate, is located in proper position and secured against rotation thereon.

A motion picture camera equipped with this improved lens turret comprises a compartment 20, formed between camera housing parts 21 and 22. In this compartment is mounted the film-shutter and transport mechanism, of which only the film-shutter blades 23 and 24 are shown, and upon the front of the housing part 22 is mounted the lens turret 25.

The housing part 21 is in the form of a plate constituting a closure for the front end of a camera housing 26 and providing a support for the operating and guide parts of a film-shutter and transport mechanism of the type shown in co-pending application Serial No. 640,952, filed January 12, 1946. This plate 21 has fixed thereon a light baffle 27 through which the film (not shown) is exposed when the openings in the film-shutter blades 23 and 24 are brought into registration therewith, as is fully explained in the above-mentioned co-pending application. A member 28 is secured to the upper part of the plate 21. This member mounts a roller 29 which serves as a guide for the upper ends of the film-shutter blades 23 and 24, and supports a turret index or detent pin 30, which serves as a part of the locking mechanism by which the lens turret 25 is secured in any one of its several positions, as will appear more fully hereinafter.

The housing part 22 is in the form of an end cap secured to the main housing 26 by means of suitable screws with the shutter-mechanism plate 21 clamped between interfitting flanges 31 and 32. A hub 33 provides support for a shaft 34 on which the lens turret 25 is mounted. The hub 33 also aids in properly spacing the end cap 22 from the shutter-mechanism plate 21. A rectangular-shaped opening 35, similar in form to the frame on the film, is formed in the housing member 22 in axial alinement with the light baffle 27. This opening 35 is no larger than is necessary to pass the extreme light rays. Accordingly, the housing outwardly of the perimeter of the opening 35 serves as a light baffle co-acting with the light baffle 27 on the housing part 21.

The lens turret 25 comprises a turret plate 36 journaled on a turret hub 37, through the medium of a bearing bushing 36' so as to be rotated, to locate one or another of a pair of lens mounts 38 in registering alinement with the optical centerline 39 and to be locked, in either of such positions, by suitable locking mechanism 40, as will be described more fully hereinafter.

The turret hub 37 is secured to the shaft 34 by means of a nut 41 set in a recess 37' and concealed by a disc 41'. A flange 42, on the turret hub 37, is received in a recess 43 and between which flange 42 and the bearing bushing 36' is arranged a spring washer 44. This washer tends to yieldingly hold the plate 36 on the turret hub 37 so that the inner face of the plate is held firmly against the bearing surfaces 45, formed on the opposed face of the housing member 22. This ensures the proper positioning of the lenses, in the mounts 38, from the film when the lens mount is properly secured on the turret, and also serves to ensure light tightness around the exposure opening.

Each lens mount 38 is of standard construction being threaded to screw into openings in the plate 36 with the flange 47, on the mount, abutting against the plate 36 to locate the respective lenses a proper distance from the film.

The locking mechanism 40 is arranged adjacent to each of the lens mounts 38 and comprises an index-pin keeper 49, adapted to co-act with the pin 30 to position and hold a particular lens mount 38 in registering alinement with the optical centerline 39. A finger pin 50, slidably supported on the keeper 49, is adapted to be actuated to retract the pin 30 to release the plate 36 and permit one lens to be moved out of alinement and another to be moved into alinement with said optical centerline 39.

The index-pin keeper 49 is in the form of a bushing pressed in an opening in the plate 36 and having a head 51 formed on the end of the bushing, opposed to the housing member 22, which end is slotted at 52 to receive the lens-index pin 30. Cam surfaces 53 are formed on the head 51 so as to guide the pin 30 into reception by the notch 52, as the plate 36 moves into a position to locate a lens mount 38 in registering alinement with the optical centerline 39. By means of a ball 55 (see Fig. 7) set in a keyway 56 and a socket 57, respectively formed in the plate 36 and the member 49, the keeper 49 is positioned on the plate 36, with the slot 52 in alinement with a radial line of the plate 36 through the axis of the pins 30 and 50, and also to secure the bushing against angular displacement on the plate.

The finger pin 50 is provided with an enlargement 58 slidably supported in the bushing locator 49 and adapted to contact a shoulder 59 (see Fig. 4) to limit the inward movement of the finger pin 50 to a point that will locate the plane of contact between the two pins, 50 and 30, inwardly of the plane of the bearing of the plate 36 against the bearing surfaces 45, when the plate 36 is to be rotated to change lenses.

The turret-index pin 30 is normally urged by a spring 60 into position to engage the slots 52 in the keepers 49, when the respective lens mounts 38 are brought into register alinement with the optical centerline 39 by the turning of the plate 36. A shoulder 61, on the pin 30, abuts against a shoulder on the member 28 to limit the extended position of the pin 30 so that its outer end may not be positioned beyond the approaching edges of the cam surfaces 53.

The operation of the device it is believed is more or less apparent from the foregoing description. A depression of the finger pin 50 retracts the lens-index pin 30 to permit a turning of the plate 36. As a lens mount approaches registering alinement with the optical centerline 39 one or the other of the cam surfaces 53 engages the turret-index pin 30 and retracts it until the axis of the lens mount 38 comes into alinement with the axis of the optical centerline 39. Thereupon the spring 60 snaps the pin 30 into the slot 52 and the lens is firmly held in position for subsequent camera operation.

Variations and modifications in the details of structure and arrangement of the parts may be resorted to within the spirit and coverage of the appended claims.

I claim:

1. An indexing detent assembly for a turret that is mounted on a support and carries a mount for an optical element that is movable by rotation of the turret into and out of a position registering with a cooperative element of an optical system, said assembly comprising a detent member mounted on the support and movable between a locking position projecting in the direction of the turret and a withdrawn releasing position and a spring urging said member toward its locking position, a cooperating keeper carried by the turret and projecting toward the support, said keeper having a recess located to engage the detent member when the mount is in its registering position and arranged to lock the turret against rotation when the detent member is so engaged, said keeper having an external camming surface inclined in the direction of movement of the keeper as the mount approaches its registering position for moving the detent member to its releasing position during such approach, and manually operable means carried by the turret for disengaging the detent member from said recess.

2. An indexing detent assembly for a turret that is rotatably mounted on a support and carries a mount for an optical element that is movable by rotation of the turret into and out of a position registering with a cooperative element of an optical system, said assembly comprising a detent member mounted on the support and movable between a locking position projecting in the direction of the turret and a withdrawn releasing position and a spring urging said member toward its locking position, a cooperating keeper carried by the turret and projecting toward the support, said keeper having a recess located to engage the detent member when the lens mount is in its registering position and arranged to lock the turret against rotation when the detent member is so engaged, said member having opposite surfaces spaced apart in the direction of movement of the keeper and that are substantially straight and parallel in the directions of movement of the member, said keeper having a recess bounded by surfaces that mate said surfaces of the detent member and said recess being located to engage the detent member when the mount is in its registering position thereby locking the turret against rotation, and manually operable means carried by the turret for disengaging the detent member from the keeper.

3. An indexing detent assembly for a turret that is rotatably mounted on a support and carries a mount for an optical element that is movable by rotation of the turret into and out of position registering with a cooperative element of an optical system, said assembly comprising a detent member mounted on the support and movable between a locking position projecting in the direction of the turret and a withdrawn releasing position and a spring urging said member toward its locking position, a cooperating keeper comprising a member mounted in the turret and having a head projecting from the turret toward the support and having oppositie outer surfaces inclined in the directions of movement of the keeper as the mount approaches its registering position for moving the detent member to its releasing position during such approach, said head having a recess for locking engagement with the detent member when the mount is in its registering position, and manually operable means carried by the turret for releasing said detent member from the recess.

4. An indexing detent assembly for a turret that is rotatably mounted on a support and carries a mount for an optical element that is movable by rotation of the turret into and out of a position registering with a cooperative element of an optical system, said assembly comprising a detent pin mounted on the support for axial reciprocation substantially parallel to the axis of the mount between a locking position projecting toward the turret and a withdrawn releasing position and spring means urging said pin toward its locking position, a keeper carried by the turret and having a bore located to receive the end portion of the pin when the mount is in its registering position, said bore having an end position adjacent the support arranged to receive and closely engage the end portions of said detent pin and an enlarged central portion, and a releasing pin manually slidable in the bore and having an inner end portion reciprocable in the inner end portion of the bore for contacting the detent pin and disengaging it from the bore and an enlarged portion reciprocable in the enlarged portion of the bore for contacting the end of said portion to limit movement of the inner end of the pin toward the support substantially to coincide with the end of the keeper.

5. An indexing detent assembly for a turret comprising a plate rotatably mounted on a support and carrying a mount for an optical element that is movable by rotation of the plate into and out of a position registering with a cooperative element of an optical system, said assembly comprising a detent pin mounted on the support for axial reciprocation substantially parallel to the axis of the mount between a locking position projecting in the direction of the plate and a withdrawn releasing position and a spring urging said pin toward its locking position, a keeper comprising a pair of members respectively having radially extending surfaces on opposite sides of the plate and contacting said sides, said members being telescopically engaged through an opening in the plate, said members enclosing a bore axially parallel to said detent pin and arranged to receive the end portion of said pin when the mount is in its registering position and to closely engage such end portion to lock the turret against rotation, and a releasing pin slidable in said bore for contacting the end of the detent pin and disengaging it from the bore.

6. An indexing detent system for a turret that is rotatably mounted on a support and carries plural mounts for optical elements that are movable by rotation of the turret selectively into registration with a cooperative optical element; said system comprising a detent member mounted on the support and movable between a locking position projecting in the direction of the turret and a withdrawn releasing position and spring means urging said member toward its locking position, cooperative keepers carried by the turret and respectively associated with the different mounts, each said keeper having spaced opposed surfaces located to engage between them said detent member when the latter is in its locking position and the associated mount is in its registering position and to lock the turret against rotation when said member is so engaged, and a movable releasing element carried by the turret in association with each said keeper and manually movable between said surfaces for disengaging the detent member.

7. In a cinematograph having a front plate provided with an aperture, a reciprocable shutter extending across the aperture in the rear of the plate, a shutter guide in the rear of the plate comprising a post extending through a guide slot in the shutter, and a turret rotatably mounted on the front of the plate and carrying a mount for an optical element movable by rotation of the plate to and from a position registering with the aperture; an indexing detent assembly for the turret comprising a detent pin reciprocable in a bore in the shutter guide post between a locking position projecting in front of the plate and a withdrawn releasing position, a spring in said bore arranged to urge said pin toward its locking position, and a keeper carried by the turret for cooperating with the pin for locking the turret against rotation when the mount is in registration with the aperture.

IRVING CISSKI.

REFERENCES CITED

The following references are of record in the file of this patent:

UNITED STATES PATENTS

| Number | Name | Date |
| --- | --- | --- |
| 1,507,447 | Wisniewski et al. | Sept. 2, 1924 |
| 1,522,395 | Thomas | Jan. 6, 1925 |
| 1,754,356 | Gordon | Apr. 15, 1930 |
| 1,830,239 | Owens | Nov. 3, 1931 |
| 1,852,450 | Dina | Apr. 5, 1932 |
| 1,883,943 | Kindlemann et al. | Oct. 25, 1932 |
| 1,893,327 | Howell | Jan. 3, 1933 |